No. 647,475. Patented Apr. 17, 1900.
G. H. CONDICT.
BATTERY HANDLING ATTACHMENT FOR MOTOR VEHICLES.
(Application filed Dec. 16, 1898.)
(No Model.) 4 Sheets—Sheet 1.

WITNESSES
James F. Duhamel
F. Hoskiner

INVENTOR,
George Herbert Condict,
BY
Frankland Jannus
ATTORNEY.

No. 647,475. Patented Apr. 17, 1900.
G. H. CONDICT.
BATTERY HANDLING ATTACHMENT FOR MOTOR VEHICLES.
(Application filed Dec. 16, 1898.)
(No Model.) 4 Sheets—Sheet 2.
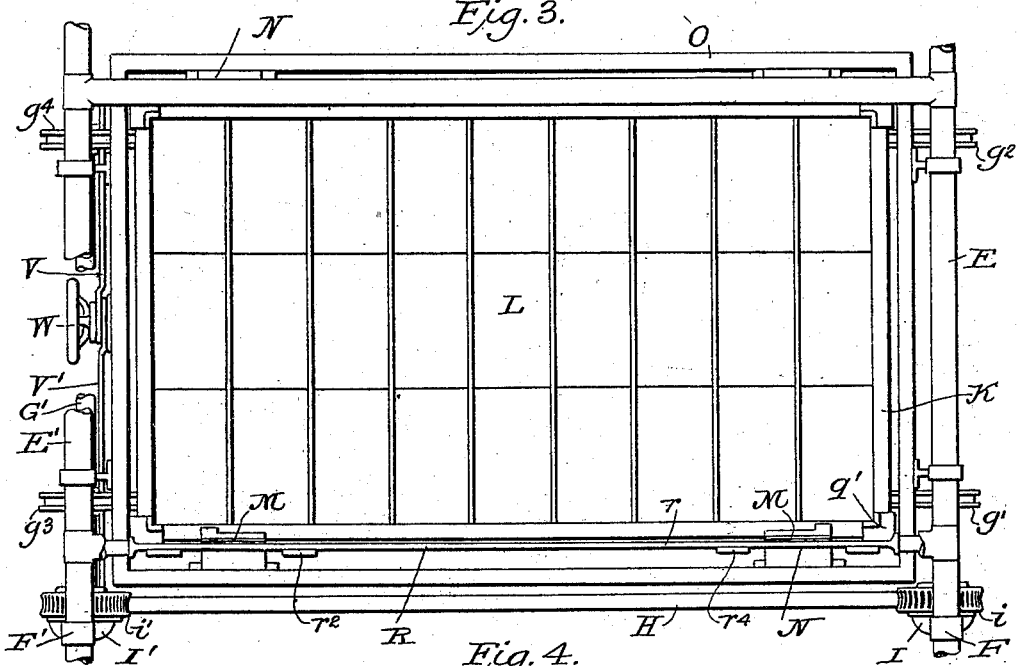
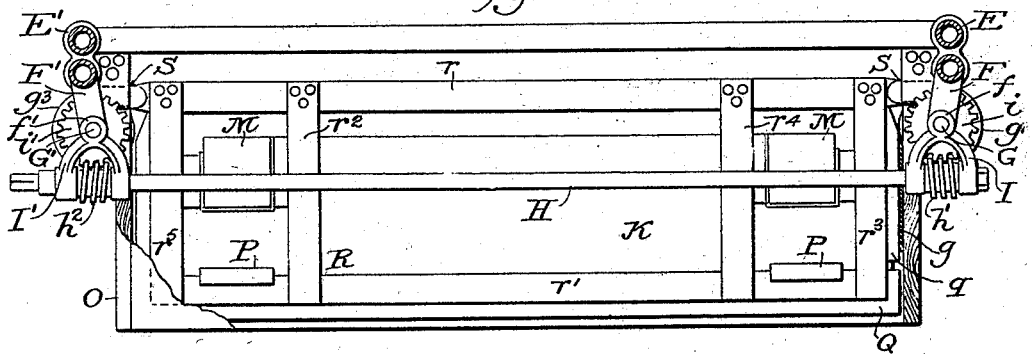
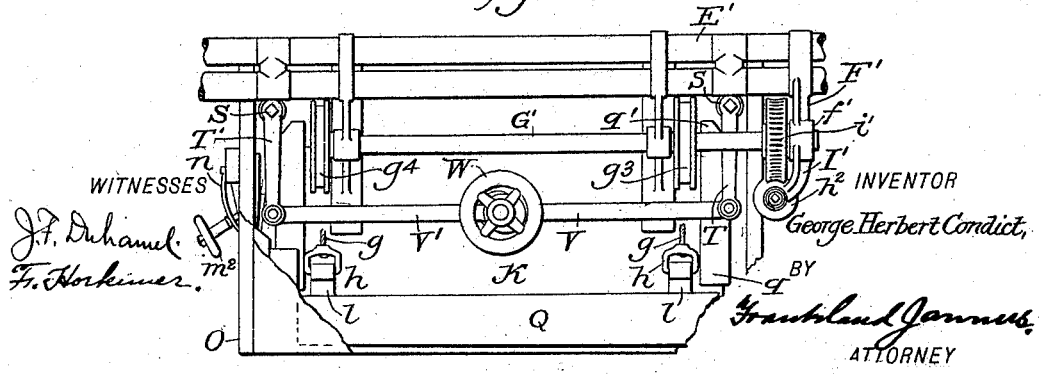

No. 647,475. Patented Apr. 17, 1900.
G. H. CONDICT.
BATTERY HANDLING ATTACHMENT FOR MOTOR VEHICLES.
(Application filed Dec. 16, 1898.)
(No Model.) 4 Sheets—Sheet 3.

WITNESSES
James F. Duhamel
F. Horkheimer

INVENTOR,
George Herbert Condict.
BY
Frankland Jannus
ATTORNEY

No. 647,475. Patented Apr. 17, 1900.
G. H. CONDICT.
BATTERY HANDLING ATTACHMENT FOR MOTOR VEHICLES.
(Application filed Dec. 16, 1898.)
(No Model.) 4 Sheets—Sheet 4.
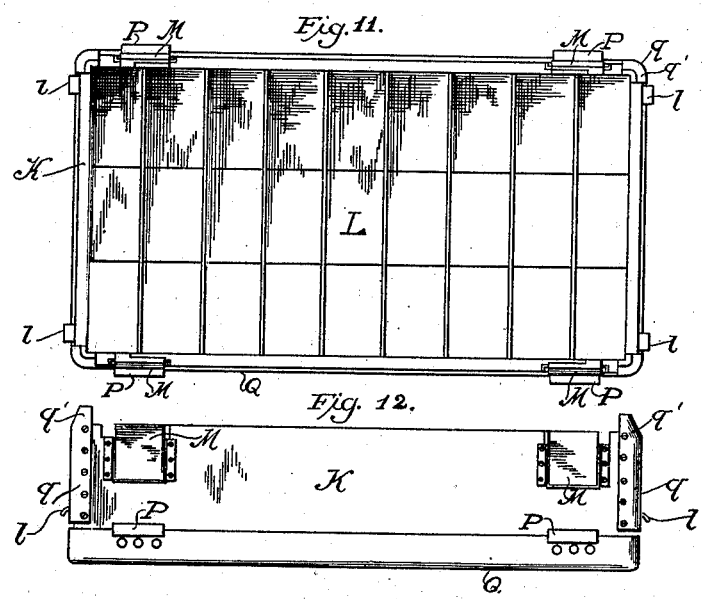
WITNESSES:
A. R. Minssen
INVENTOR:
George Herbert Condict.
BY
ATTORNEY.

UNITED STATES PATENT OFFICE.

GEORGE HERBERT CONDICT, OF NEW YORK, N. Y., ASSIGNOR, BY MESNE ASSIGNMENTS, TO THE COLUMBIA AND ELECTRIC VEHICLE COMPANY, OF JERSEY CITY, NEW JERSEY, AND HARTFORD, CONNECTICUT.

BATTERY-HANDLING ATTACHMENT FOR MOTOR-VEHICLES.

SPECIFICATION forming part of Letters Patent No. 647,475, dated April 17, 1900.

Application filed December 16, 1898. Serial No. 699,424. (No model.)

*To all whom it may concern:*

Be it known that I, GEORGE HERBERT CONDICT, a citizen of the United States of America, and a resident of the city of New York, county and State of New York, have invented certain new and useful Improvements in Battery Apparatus for Electric-Motor Vehicles, of which the following is a specification.

My invention relates to means for raising a tray of storage batteries into the desired position for use upon a motor car or vehicle and also for lowering a discharged tray therefrom, said means comprising an apparatus, permanently connected with the vehicle, whereby the heavy trays of batteries used to supply electric current to such vehicles may be handled—that is, placed in operative position or released therefrom—by apparatus carried upon the vehicle, thereby rendering the same independent of any battery-handling apparatus external to the vehicle and placing the work within the power and control of an individual.

The invention also comprises some details of construction and arrangement, as will be hereinafter pointed out, reference being had to the accompanying drawings, in which—

Figure 1:
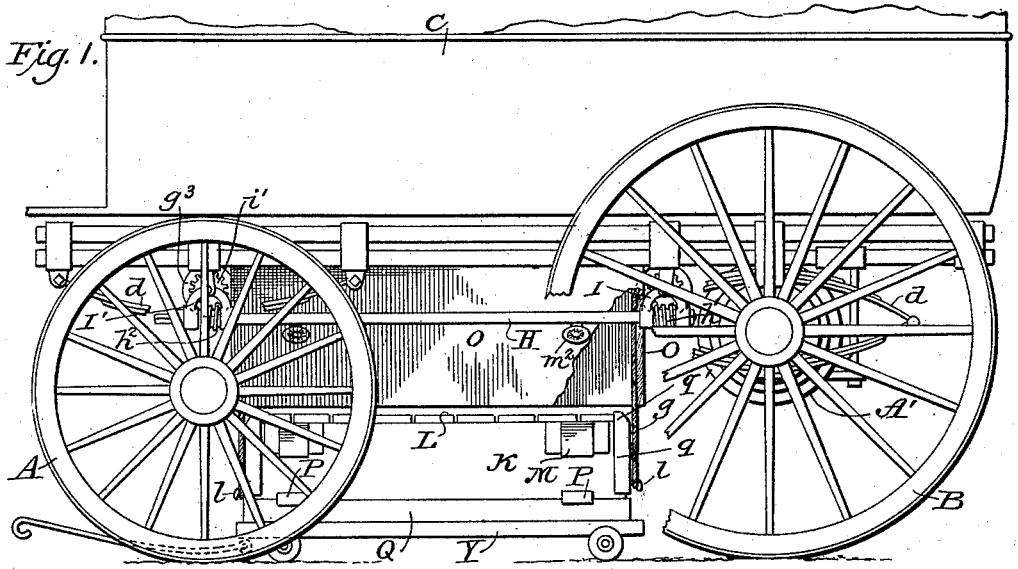
Figure 2:
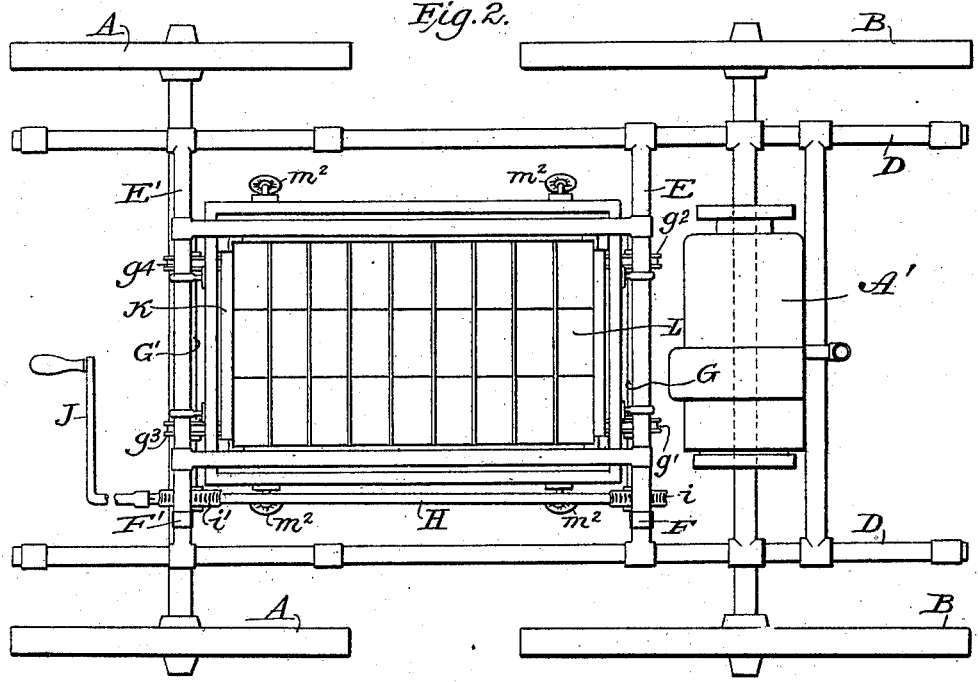
Figure 7:
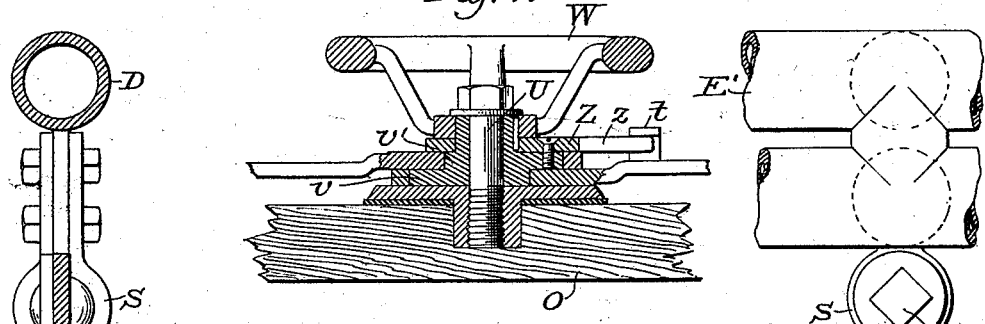
Figure 6:
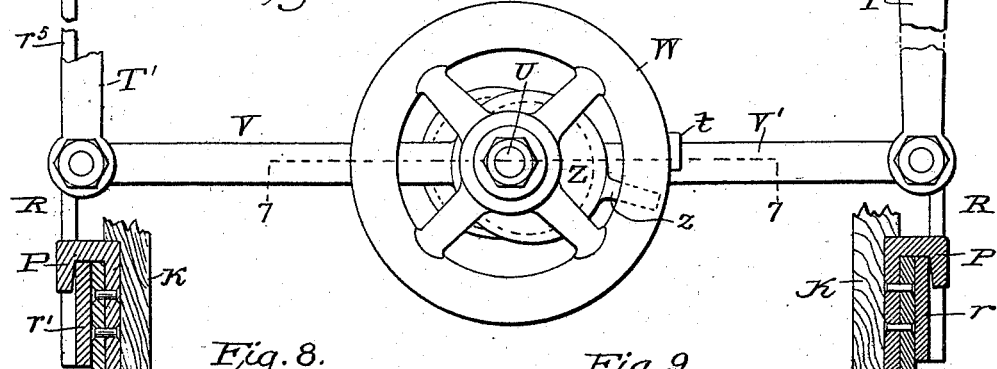
Figure 8:
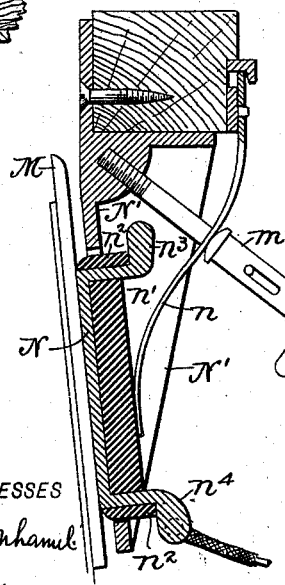
Figure 9:
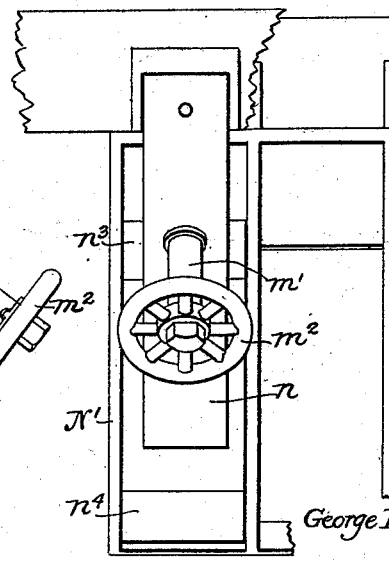
Figure 10:
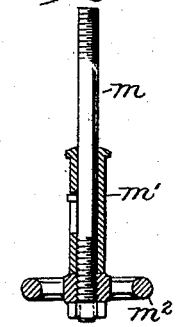

Figure 1 is a side elevation of the running-gear and part of the body of a motor-vehicle to which the invention is applied. Fig. 2 is a top plan view of the running-gear, Fig. 1, without the body. Fig. 3 is a top plan view of the battery-tray and connected parts, the wheels and parts of the running-gear being omitted. Fig. 4 is a side elevation of the battery-tray and connected parts seen in plan view in Fig. 3. Fig. 5 is an end view of Figs. 2 and 3, parts being broken away for convenience of illustration. Fig. 6 is an enlarged detailed view showing the means for opening and closing the battery-tray-supporting devices. Fig. 7 is a sectional view on the line 7 7, Fig. 6. Fig. 8 is an enlarged sectional view of one of the inclined contact-plates. Fig. 9 is a view in elevation similar to and of the parts shown in Fig. 8. Fig. 10 is a sectional view of the adjusting device for the tension-spring of Figs. 8 and 9. Fig. 11 is a plan view of a group of batteries and containing-tray. Fig. 12 is a side elevation of the battery-tray.

In said drawings, Figs. 1 and 2, A B indicate the front and rear wheels of a motor-vehicle, the motor itself being shown in conventional form at A'. C is a portion of a body which is supported upon a frame which has longitudinal bars D D and may be supported upon suitable springs $d$ $d$. To this frame or any other which may be preferred are secured transverse bars E E'. Arms F F' are secured to the transverse bars E E', depending therefrom on each side of the center of the vehicle. The arms are formed with bearings $f f'$, in which are journaled shafts G G', and upon each of these shafts are winding-drums $g'$ $g^2$ $g^3$ $g^4$, each provided with cords or chains $g$, having loops or hooks $h$ at their lower ends.

A worm-shaft H, carrying worm-pinions $h'$ $h^2$, one at each end, is mounted in bearings formed in suitable yokes I I', depending from or made integral with the bearings $f f'$. At one end of each of the shafts G G' are secured worm-gears $i$ $i'$, which mesh with and are driven by the worm-pinions $h'$ $h^2$ upon the shaft H when rotary movement is applied to said shaft, which may be in any convenient manner, as by a detachable hand-crank J, which may be fitted to work with a ratchet or be prolonged, as indicated in Fig. 2, to clear the frame of the vehicle.

K is the container or tray, within which a group L of storage batteries for operating the motor-vehicle is arranged. The tray K is usually provided with two or more contact-plates M, which are attached to the outer sides of the tray in inclined positions. Hooks $l$ are secured to the ends of the tray, upon its outside, in position to connect with loops $h$, attached to the cords $g$, whereby when the worm-shaft H is turned the winding-drums upon the shafts G G' will wind up said cords simultaneously and lift the tray of batteries into position under the body of the vehicle.

The tray K, in which the batteries L are contained, is usually a stout wooden box, as indicated, which is reinforced by an angle-iron Q, extending around its lower portion and under the bottom thereof. Supporting-hooks P are attached to this angle-iron, usually at the sides, and in some instances also it is provided with an additional set of liftinghooks $l$, also riveted to the angle-iron Q at the ends of the tray. The tray being especially designed to be applied to and removed from the vehicle vertically from below is further provided at its corners with rounded metallic reinforcing-pieces $q$, which are sloped or beveled inwardly at their upper ends $q'$ in order that if the tray should be slightly out of position the said curved portions $q'$ of the corner-braces $q$ will guide the tray to the proper points for engagement with the supporting devices. At the same time the corner-braces $q$ greatly increase the strength and durability of the tray, which when filled with its quota of storage batteries frequently weighs several thousand pounds. The tray is furthermore provided with four permanent contact-plates M, which are connected with batteries L in the tray in the desired electrical relationship and as the battery is forced upward into position make contact with four correspondingly-placed contact devices upon the vehicle, which are connected with the working circuit of the propelling motor or motors and controlling apparatus, one of these contacts being shown in Fig. 8.

A casing having sides and ends O is attached to the frame of the vehicle, and the tray of batteries is contained and protected inside of it. Within the casing O and attached to the frame of the vehicle are two or more inclined spring-pressed contact-plates N, one of which is shown on enlarged scale in Fig. 8. These contact-plates are held outward by spring $n$, through which passes a fixed bolt $m$, upon the outer end of which is a sleeve $m'$, which may be adjusted upon the bolt to increase the tension of the spring $n$ against the contact N, as by a hand-wheel $m^2$ upon the screw-threaded outer end of the bolt $m$. The spring-pressed contact N is loosely held in an opening in a frame or housing N', from which it is insulated by a block of insulating material $n'$ at its rear side and smaller blocks $n^2$ at its top and bottom. The contact piece or block N is provided with end lugs $n^3$ $n^4$, which prevent it being forced through the opening in the housing, and to which latter the conductors supplying the motor-circuit can be attached.

As the tray of batteries is hoisted into position the contact-plates M carried thereby will engage and rub against the spring-pressed blocks N, which being free to move under stress of spring $n$ will make a good and ample electrical connection therewith.

Each of the trays K is provided at its sides with two or more hooks P, and said tray is furthermore strengthened by a binding of metal Q, which extends all around the sides and also under the bottom edges of the tray, and to this strengthening-plate the hooks P and $l$ are attached for greater strength and durability. The trays of batteries when in operative position are sustained by latch-plates R, which are arranged one on each side of the interior of the outer casing O. The latch-plates may be variously formed, but as indicated comprise upper and lower bars $r$ $r'$, united by vertical strips $r^2$ $r^3$ $r^4$ $r^5$, forming two stiff frames. The upper members $r$ of each latch-plate are pivoted in suitable bearings S S, attached to the cross-bars E E', and the edges of the lower members $r'$ fit under the hooks P and support the tray of batteries.

In order to admit of the raising and lowering of the tray of batteries by the hoisting apparatus, the latch-plates are thrown out of engagement with the hooks P and held out until required. To this end crank-arms T T' are attached, one to each of the front ends of the upper members $r$ of the latch-plates R. At a convenient point upon the box O or other suitable support is secured a stud U, upon which is rotatably mounted a double eccentric $v$ $v'$, connected with hand-wheel W. Eccentric-rods V V' are pivoted to the outer ends of the crank-arms T T' and formed with straps on their inner ends, which engage the eccentrics $v$ $v'$. When the hand-wheel W is turned, the eccentrics will be rotated and the rods V V' will be drawn together, drawing the latch-plates under the hooks P, as when a fresh tray of batteries has been hoisted into position, and, vice versa, when it is desired to remove a tray of exhausted batteries from the vehicle, the said tray having first been slightly raised by means of the hoisting apparatus to lift the edges of the hooks P above the edges of the lower members of the latch-plates, the hand-wheel W is turned in the direction to separate the latch-plates, when they will be forced out by the eccentrics and connections from under the hooks P and be so held by the eccentrics, permitting the lowering of the tray and the insertion of a new one. By again turning the hand-wheel W the latch-plates will be brought under the hooks P, after which the tray of batteries will be lowered slightly, so as to bring the edges of the hooks P over the edges of the latch-plates, which will then securely hold the tray.

A cap-plate Z may be placed over the upper eccentrics $v'$ and be provided with a lug $z$, projecting laterally, or the lug $z$ may be attached to the hand-wheel W. The lug $z$ is arranged to fit under or abut against a stop or catch $t$ upon eccentric-rod T to permit further movement of the hand-wheel W and connected parts when the latch-plates have been brought thereby into operative position under the hooks P by which the trays of batteries are sustained upon the vehicle.

The inclined contacts N will yield to permit the tray to be raised slightly above its working position to free the latch-plates. When a tray of batteries has been dropped or it is desired to place a fresh tray of batteries upon the vehicle, it can be run into position under the elevating mechanism of the vehicle upon a hand-truck Y, or the vehicle is moved into position over the battery to be raised.

While I have described the location of the various parts of the apparatus in order that the construction shown in the drawings may be readily understood, I do not limit myself to such specific arrangement, as the details of construction may in view of the foregoing be varied in many particulars without departing from the invention.

Having described my invention, what I claim is—

1. The combination with a motor-vehicle and a group of storage batteries for supplying current thereto, of means carried by the vehicle for raising the group of batteries into operative position upon the vehicle, and for lowering the same therefrom, and separate means for locking the batteries in suspended engagement with the vehicle.

2. The combination in a motor-vehicle of a body, a downwardly-opening compartment below the floor thereof, and a group of storage batteries for operating the vehicle, of means carried by the vehicle for raising or lowering the group of storage batteries thereon.

3. In a motor-vehicle electrically propelled, the combination of a body, a battery-tray, a downwardly-opening battery-compartment below the floor of the body, electrical contacts on the tray and contacts attached to the vehicle.

4. In a motor-vehicle electrically propelled, the combination of a body, a battery-tray, a downwardly-opening battery-compartment below the floor of the body, electric contacts on the interior of the compartment and contacts on the tray registering with those in the compartment.

5. In a motor-vehicle electrically propelled, the combination of a body, a battery-tray, a downwardly-opening battery-compartment below the floor of the body, electrical contacts on the interior of the compartment and contacts on the tray registering with those in the compartment, said contacts engaging and effecting a rubbing contact during the insertion of the battery.

6. In a motor-vehicle electrically propelled, the combination of a body, a battery-tray, a downwardly-opening battery-compartment below the floor of the body, electrical contacts on the interior of the compartment and contacts on the tray registering with those in the compartment, one of each of the engaging contacts being adapted to yield when so engaged.

7. The combination with a motor-vehicle, of a tray containing storage batteries to operate the same and provided with inwardly-inclined fixed contact-surfaces, of correspondingly-inclined yielding contact-blocks mounted on the vehicle in position to engage the contacts upon the tray when the latter is lifted into position.

8. The combination with a frame or housing N' having an inclined face and having a suitable aperture therein, the contact-block N extending through the aperture in said housing and insulated therefrom, and the adjustable tension-spring $n$, substantially as described.

9. The combination with a motor-vehicle and a tray of storage batteries for operating the same, means for raising and lowering a tray of batteries into position, inclined yielding contacts upon the vehicle and inclined rigid contact-plates corresponding and engaging therewith and carried by the battery.

10. In a motor-vehicle electrically propelled, the combination of a body, a battery-tray, a downwardly-opening battery-compartment, and means upon the tray and devices upon the vehicle adapted to engage the means upon the tray for locking the tray in suspended engagement in the compartment.

11. The combination with a motor-vehicle, a tray of storage batteries for supplying current thereto, said tray being provided with suspending-hooks, swinging latch-plates adapted to engage said hooks to support the tray in operative position and positive means for moving and holding said latch-plates outward to release the tray or inward into engagement with the hooks, substantially as set forth.

12. The combination with a motor-vehicle and a tray of storage batteries for supplying current to operate the same, hooks upon the sides of the tray, hoisting apparatus carried by the vehicle and adapted to engage the hooks upon the tray, swinging latch-plates attached to the vehicle and means for separating the latch-plates to release the tray when acted upon by the hoisting apparatus.

13. In a motor-vehicle electrically propelled, the combination of a body, axles, a downwardly-open space between said axles, a battery-tray, means for holding said tray in substantially-rigid engagement with said vehicle in said space, a casing about said space depending from the vehicle and inclosing said holding means.

14. In a motor-vehicle electrically propelled, the combination of a body, axles, a downwardly-open space between said axles, a battery-tray, means for holding said tray in substantially-rigid engagement with said vehicle in said space, contacts for effecting electrical connections between said battery and said vehicle, a casing about said space depending from the vehicle and inclosing and protecting said contacts.

15. In a motor-vehicle electrically propelled, the combination of a body, axles, a downwardly-open space between said axles, a battery-tray, means for holding said tray in suspension with said vehicle, and contacts on said vehicle and upon the tray, a casing about said space depending from the vehicle and inclosing said holding means and said contacts.

16. A tray for containing battery-jars having fixed contact-plates at its sides, said contact-plates being placed in an inwardly-inclined position.

17. A tray for containing a group of battery-jars and provided with reinforcing corner-pieces having inwardly-sloping upper ends.

18. In an electric-motor vehicle, a downwardly-open space adapted for the reception of a storage battery, a battery or tray, portions of said tray and of said vehicle adapted to coact in guiding said tray into its position for suspension on the vehicle.

19. In an electric-motor vehicle, a downwardly-open space adapted for the reception of a storage battery, a battery or tray, portions of said tray and of said vehicle adapted to coact in guiding said tray into its position for suspension on the vehicle, parts of the vehicle engaging the tray and so positioned as to resist lateral displacement thereof.

Signed by me at New York, N. Y., this 15th day of December, 1898.

GEORGE HERBERT CONDICT.

Witnesses:
MACK TURK,
FRANKLAND JANNUS.